US008781152B2

(12) United States Patent
Momeyer et al.

(10) Patent No.: US 8,781,152 B2
(45) Date of Patent: Jul. 15, 2014

(54) IDENTIFYING VISUAL MEDIA CONTENT CAPTURED BY CAMERA-ENABLED MOBILE DEVICE

(76) Inventors: Brian Momeyer, San Diego, CA (US); Selena Salazar, San Diego, CA (US); Babak Forutanpour, San Diego, CA (US)

( * ) Notice: Subject to any disclaimer, the term of this patent is extended or adjusted under 35 U.S.C. 154(b) by 725 days.

(21) Appl. No.: 12/850,732

(22) Filed: Aug. 5, 2010

(65) Prior Publication Data

US 2012/0033876 A1 Feb. 9, 2012

(51) Int. Cl.
*G06K 9/00* (2006.01)

(52) U.S. Cl.
USPC ........... 382/100; 382/181; 382/190; 382/195; 709/201; 709/202; 709/203; 725/14; 725/19; 725/62; 725/63

(58) Field of Classification Search
USPC .......... 382/100, 181, 190, 195; 709/201–203, 709/223–226; 725/14, 19, 37, 38, 59, 62, 725/63, 86, 93–96, 99, 105, 106
See application file for complete search history.

(56) References Cited

U.S. PATENT DOCUMENTS

| | | | | |
|---|---|---|---|---|
| 6,898,316 B2 * | 5/2005 | Zhou | ............................. | 382/190 |
| 7,372,485 B1 * | 5/2008 | Bodnar et al. | ................. | 348/234 |
| 7,506,261 B2 * | 3/2009 | Satou et al. | ................... | 345/619 |
| 7,616,840 B2 * | 11/2009 | Erol et al. | ...................... | 382/305 |
| 2002/0072982 A1 | 6/2002 | Barton et al. | | |
| 2007/0124775 A1 * | 5/2007 | DaCosta | ......................... | 725/62 |
| 2008/0214236 A1 | 9/2008 | Harb | | |
| 2008/0239081 A1 * | 10/2008 | Helbing | ........................ | 348/169 |
| 2009/0174674 A1 | 7/2009 | Forutanpour | | |
| 2009/0259745 A1 | 10/2009 | Lee | | |
| 2010/0033617 A1 * | 2/2010 | Forutanpour | ................. | 382/266 |

(Continued)

FOREIGN PATENT DOCUMENTS

| | | |
|---|---|---|
| EP | 1921852 A1 | 5/2008 |
| JP | 2002352190 A | 12/2002 |

(Continued)

OTHER PUBLICATIONS

Ivan Kastelan, Nikola Teslic, Vukota Pekovic and Tarkan Tekcan, "TV Screen Content Extraction and Recognition Algorithm for the Verification of Digital Television Systems", IEEE International Conference and Workshops on Engineering of Computer-Based Systems, Mar. 2010, pp. 226-231.*

(Continued)

*Primary Examiner* — Eric Rush
(74) *Attorney, Agent, or Firm* — Abdollah Katbab

(57) ABSTRACT

Automatic identification of media content is at least partially based upon visually capturing a still or video image of media content being presented to a user via another device. The media content can be further refined by determining location of the user, capturing an audio portion of the media content, date and time of the capture, or profile/behavioral characteristics of the user. Identifying the media content can require (1) distinguishing a rectangular illumination the corresponds to a video display; (2) decoding a watermark presented within the displayed image/video; (3) characterizing the presentation sufficiently for determining a particular time stamp or portion of a program; and (4) determining user setting preferences for viewing the program (e.g., close captioning, aspect ratio, language). Thus identified, the media content appropriately formatted can be received for continued presentation on a user interface of the mobile device.

74 Claims, 13 Drawing Sheets

(56) References Cited

U.S. PATENT DOCUMENTS

| | | | |
|---|---|---|---|
| 2010/0034481 A1 | 2/2010 | Forutanpour | |
| 2010/0070523 A1 | 3/2010 | Delgo et al. | |
| 2011/0169976 A1* | 7/2011 | Carter et al. | 348/222.1 |
| 2011/0247042 A1* | 10/2011 | Mallinson | 725/86 |
| 2012/0008821 A1* | 1/2012 | Sharon et al. | 382/100 |

FOREIGN PATENT DOCUMENTS

| | | |
|---|---|---|
| JP | 2006514344 A | 4/2006 |
| TW | 201005656 A | 2/2010 |
| WO | WO2006036853 A2 | 4/2006 |
| WO | 2009148409 A1 | 12/2009 |
| WO | 2010070568 A1 | 6/2010 |

OTHER PUBLICATIONS

Jinqiao Wang, Lingyu Duan, Lei Xu, Hanqing Lu and Jesse Jin, "TV Ad Video Categorization with Probabilistic Latent Concept Learning" Proceedings of the International Workshop on Multimedia Information Retrieval, 2007, pp. 217-226.*

Marleen Morbee, Vladan Velisavljevic, Marta Mrak and Wilfried Philips, "Scalable feature-based video retrieval for mobile devices", Proceedings of the First International Conference on Internet Multimedia Computing and Service, 2009, pp. 3-9.*

Jinqiao Wang, et al., "TV Ad Video categorization with probabilistic Latent concept Learning", Proceedings of the International Workshop on Multimedia Information Retrieval, Sep. 28, 2007, pp. 217-226, XP55013287.

Partial International Search Report—PCT/US2011/046855—ISA/EPO—Dec. 9, 2011.

International Search Report and Written Opinion—PCT/US2011/046855—ISAEPO—Mar. 23, 2012.

Morbee M et al: "Scalable 1,22-26, feature-based video retrieval for mobile 37-40, devices", 61-65, Proceedings of the First International 76-79 Conference on Internet Multimedia Computing and Service (ICIMCS '09), Oct. 19, 2009, pp. 3-9, XP55021960.

Taiwan Search Report—TW100140157—TIPO—Mar. 14, 2014.

* cited by examiner

IDENTIFYING VISUAL MEDIA CONTENT CAPTURED BY CAMERA-ENABLED MOBILE DEVICE

BACKGROUND

1. Field

The present disclosure relates to a mobile operating environment, and more particularly, to visually identifying visual media content captured by a camera-enabled mobile device.

2. Background

Over several decades, developments in digital image processing have attempted to automate certain vision capabilities, such as image recognition. Computer vision has attempted to recognize obstacles in order to allow for autonomous navigation. Optical character recognition relies upon techniques such as detecting a skew in an image and performing character shape correlations. Surveillance systems attempt to recognize biometric data such as faces in order to maintain security.

One example of image processing is generating a digital key signature for each known segment of a video broadcast program that can be later matched by a digital key signature generated for an unknown segment. Such techniques were used for automated tracking by broadcast advertisers to see what commercials were aired in particular markets. Such processing benefited from being able to sample a high fidelity version of the broadcast video signal. In addition, such sampling and analysis could be performed by equipment that had a high processing capacity for the time. As such, the image processing was performed by devices that were generally not mobile nor intended for consumer use.

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein.

Digital signal processors (DSPs), image processors, and other processing devices are frequently used in portable personal computing devices that include digital cameras, or that display image or video data captured by a digital camera. Such processing devices can be utilized to provide video and audio functions, to process received data such as image data, or to perform other functions. Digital imaging technology allows for compact devices to capture image data, as well as enhance and transmit image data.

Instances can arise where a user is consuming media content in some venue, but would like to watch or read that data on the go, on their mobile device. Desiring to continue watching or reading this content after leaving the venue, the user desires to easily locate this content without an extensive search. This can be especially true given a lack of direct access to the source of the media content. In addition, unlike audio recognition, numerous complications can arise in performing automated vision recognition of a segment of media content. Trying to capture an image or video segment through a viewfinder of a portable personal computing device can be complicated by the orientation of the image and extraneous images within the field of view.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method is provided for identifying visual media content. An image is received from a camera of a mobile device. A quadrilateral is detected contained within the image. Visual media content contained within the quadrilateral is captured for identifying the visual media content.

In another aspect, at least one processor is provided for identifying visual media content. A first module receives an image from a camera of a mobile device. A second module detects a quadrilateral contained within the image. A third module captures visual media content contained within the quadrilateral for identifying the visual media content.

In an additional aspect, a computer program product is provided for identifying visual media content. A non-transitory computer-readable storage medium comprises sets of codes. A first set of codes causes a computer to receive an image from a camera of a mobile device. A second set of codes causes the computer to detect a quadrilateral contained within the image. A third set of codes causes the computer to capture visual media content contained within the quadrilateral for identifying the visual media content.

In another additional aspect, an apparatus is provided for identifying visual media content. Means are provided for receiving an image from a camera of a mobile device. Means are provided for detecting a quadrilateral contained within the image. Means are provided for capturing visual media content contained within the quadrilateral for identifying the visual media content.

In a further aspect, an apparatus is provided for identifying visual media content. A camera of a mobile device generates an image. A computing platform detects a quadrilateral contained within the image received from the camera, and captures visual media content contained within the quadrilateral for identifying the visual media content.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Occasions arise when media content (e.g., text, image, video) being viewed needs to be identified and delivered via another means. Thereby a user can consume media content in a convenient manner. For example, a user can read media content, such as a text-based news or entertainment article contained in a printed a periodical publication or displayed on a computer monitor. Similarly, the media content can be graphical, such as a schematic drawing or a photograph. As another example, a user can be visiting a venue in which video media content is being displayed. In order to quickly capture what is being viewed for later retrieval, the user can conveniently use a camera capability. In order to quickly capture and later refer to the full content of the text-based or graphical article or video media content, the user can use a camera-enabled mobile device (e.g., smart phone, portable game console, personal digital assistant, etc.).

Figure 1:
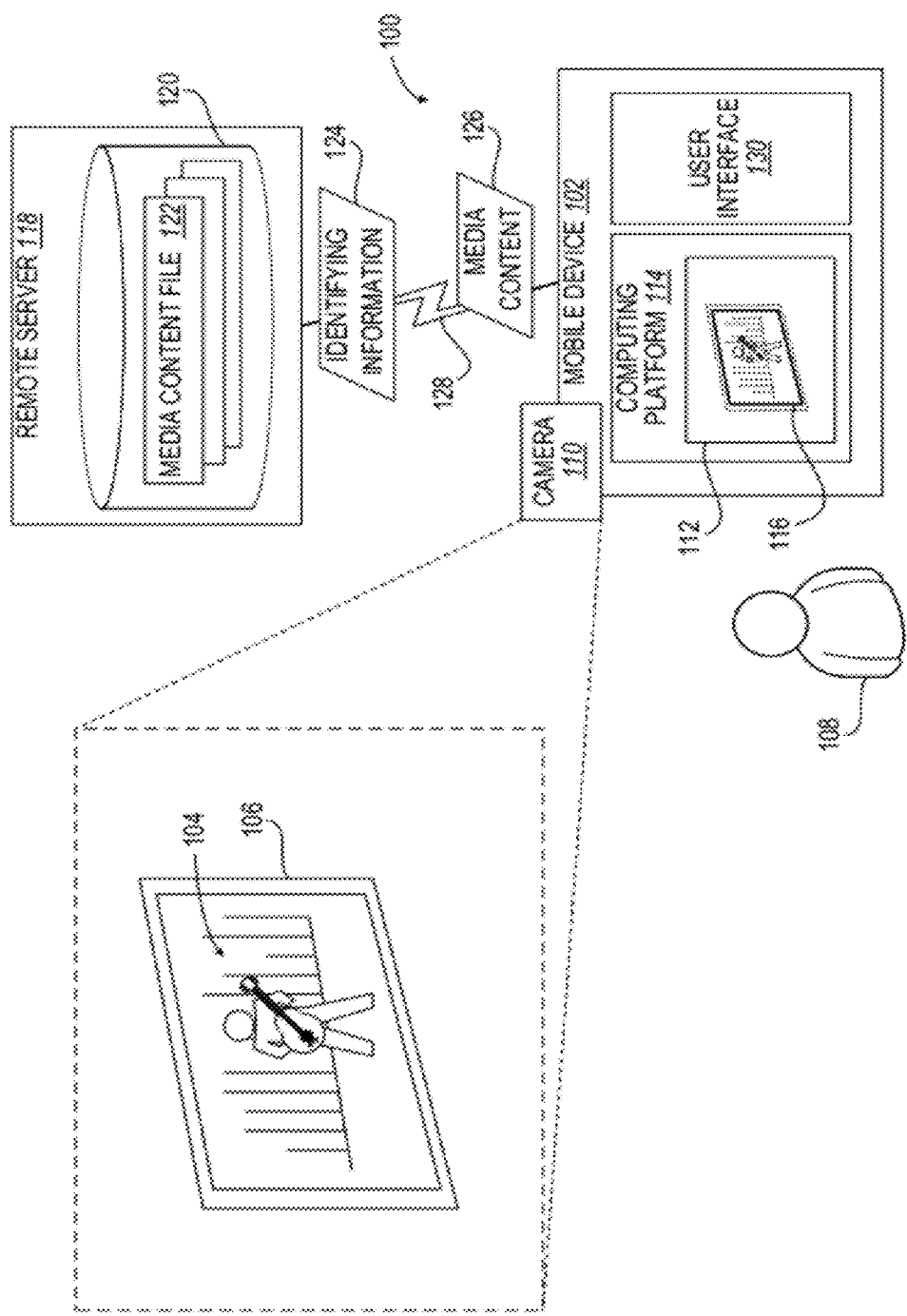
FIG. 1 illustrates a schematic diagram of a mobile device that identifies visual media content externally presented by a display for viewing by a user.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects With initial reference to FIG. 1, an apparatus 100, depicted as a mobile device 102, identifies visual media content 104 externally presented by a display 106 for viewing by a user 108. A camera 110 of the mobile device 102 generates a digital image 112. A computing platform 114 detects a quadrilateral 116, which corresponds to the external display 106 and is contained within the digital image 112 received from the camera 110. The computing platform 114 can direct higher resolution imaging by the camera 110 to encompass the quadrilateral 116 for capturing the visual media content 104 contained within the quadrilateral 116. The computing platform 114, a remote server 118, or both cooperatively can analyze the visual media content 104 for identifying against a database 120 of media content files 122. Identifying information 124 or a more complete version 126 of the visual media content 104 can then be transmitted over an air channel 128 to the mobile device 102 for presenting on a user interface 130 to the user 108.

Figure 2:
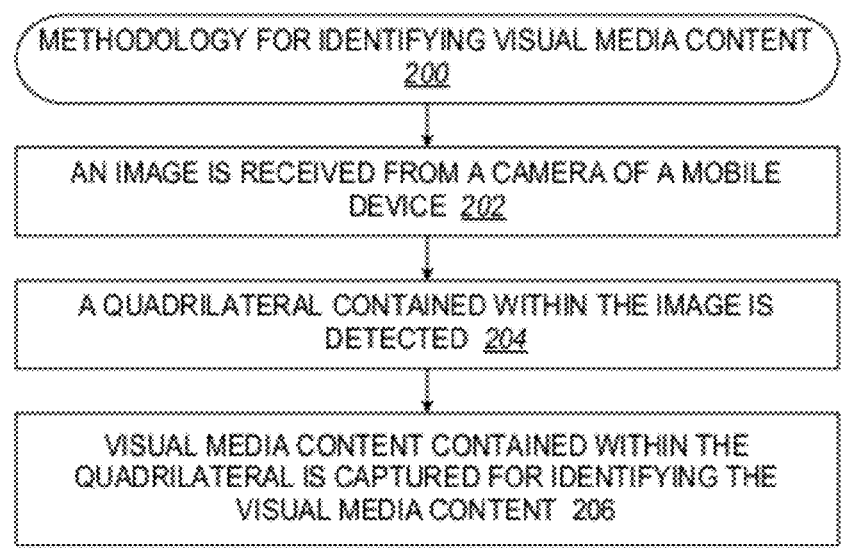
FIG. 2 illustrates a flow diagram of a methodology or sequence of operations for identifying visual media content.

In FIG. 2, a methodology or sequence of operations 200 is depicted for identifying visual media content. An image is received from a camera of a mobile device (block 202). A quadrilateral contained within the image is detected (block 204). Visual media content contained within the quadrilateral is captured for identifying the visual media content (block 206).

In an exemplary use, consider that the user is watching media content such as a movie on television but chooses to watch the remaining portion on a mobile device. The user points a camera of his mobile phone at the TV. The mobile device is triggered to identify the programming on the TV working through the viewfinder of the mobile device by processing incoming frames. In particular, the image on the TV is cropped from the background leveraging anticipation that the TV is a quadrilateral, centered in the viewfinder, and generally brighter than the surroundings. A portion of the captured content, perhaps pre-processed for machine vision recognition, can be sent to a server to find which movie this sequence is from. For example, such systems could use a hash table to quickly find which scenes from which movies should be further examined. The key to the hash table would be to use localized histogram of colors found in the frames. For instance, if the upper left quadrant of the image 1 has 50% blue pixels, 30% white, and 20% black, and then it changes to 30% blue, and 50% white and 20% black over a given time, this signature, in conjunction with the three other quadrants, would be used to narrow down the scenes from frames from movie database. From this reduced set, one would then repeat the process not based on color, but frequency. If the upper quadrant has 700 edge pixels at a given time, going to 400 edges over 300 frames, this pattern would further reduce the set. From this reduced set of clips, the system could employ SIFT or some other feature based extraction method to narrow down the exact frame. Once the name of the movie and timestamp are discovered, the device can connect to a proprietary service, purchase, and then download the entire movie but stream the title from the spot the user is currently viewing the film on the TV.

In addition to the image detection method, the microphone can be used to capture audio from the TV and use this in a hash lookup function to assist the determination of media content. Alternatively, the mobile device can employ image processing algorithms, either locally or on a remote server, to identify forensic video watermarking. Video watermarking can contain a timestamp, client identifier, and content identifier, allowing for extraction of these data even after compression and multiple digital-analog-digital conversions.

In another aspect, if the user is reading an article on their PC, magazine, newspaper, book, etc., but chooses to access the content on their mobile device. The user takes a picture of the content. For instance, the camera uses a macro mode for focusing on objects less than 2 feet from a lens and has a resolution sufficient for optical character recognition. A recognized alphanumeric character string can thus be searched against a search engine with top article matches presented to the user on a user interface for selection. The identified articles that match can be bookmarked or downloaded for future reference. If the content is copyrighted and/or not available online, watermarking technology can be used to determine whether the user is a rights holder to the content. If watermarking technology is not employed, but the content is still copyrighted, the user can enter a subscription identifier from a physical copy of the content (e.g., book, periodical) to access that content.

Alternatively, if the article is not available, the system could pull up similar articles on the topic or articles from the same author.

Figure 3A:
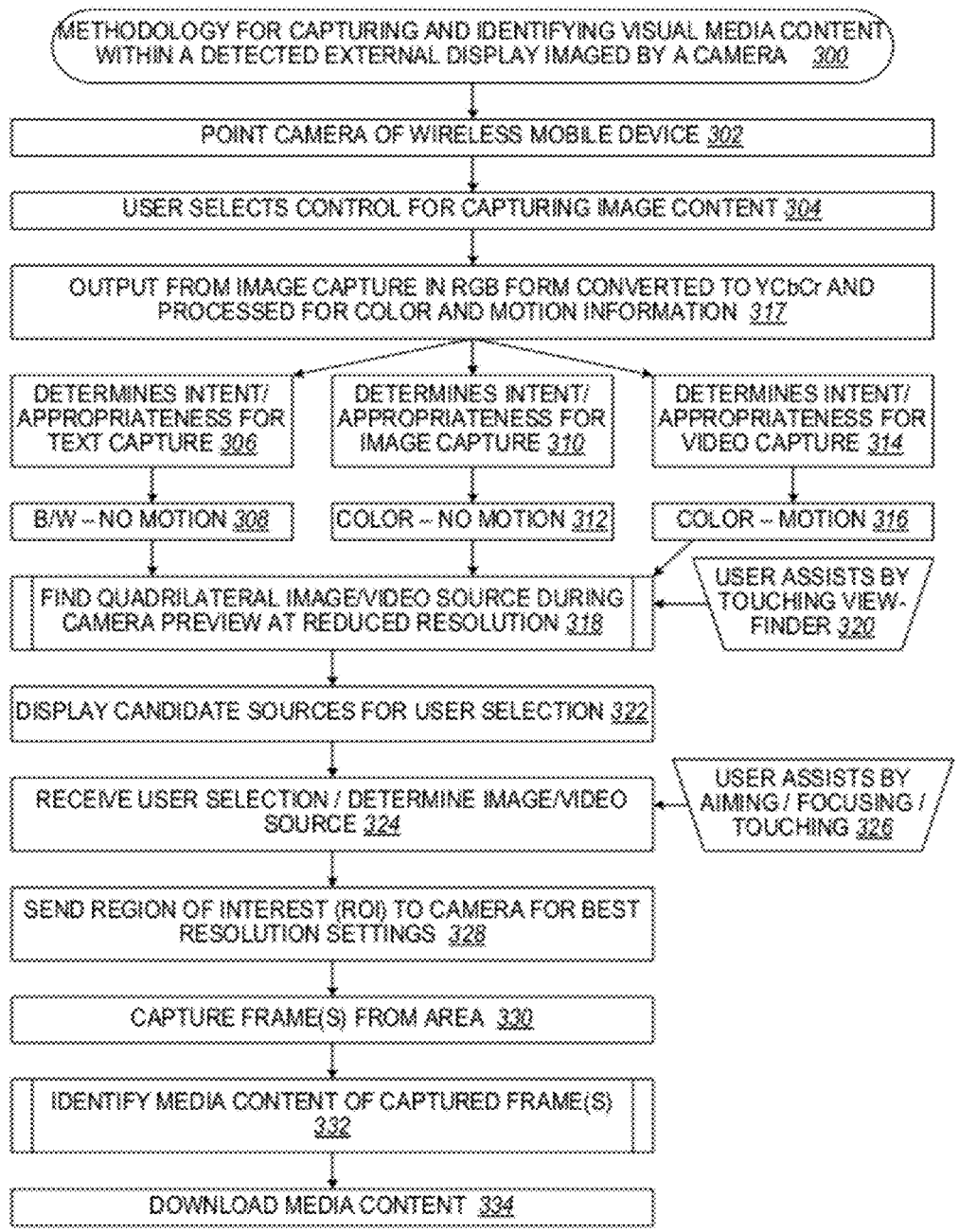
FIG. 3A illustrates a flow diagram of a methodology or sequence of operations for capturing and identifying visual media content within a detected external display imaged by a camera.
Figure 3B:
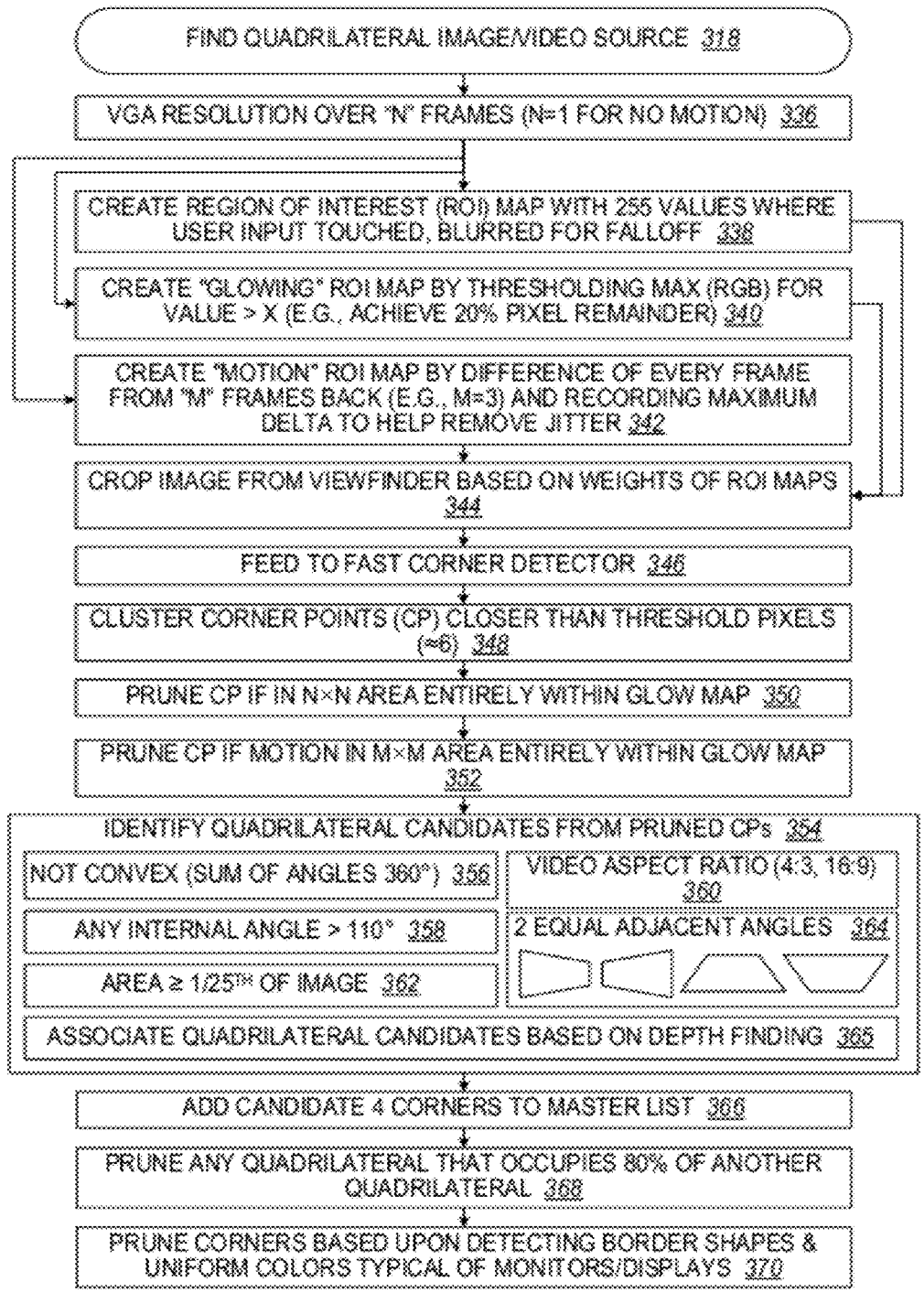
FIG. 3B illustrates a flow diagram of a methodology or sequence of operations for finding the quadrilateral image/video source within an image.
Figure 3C:
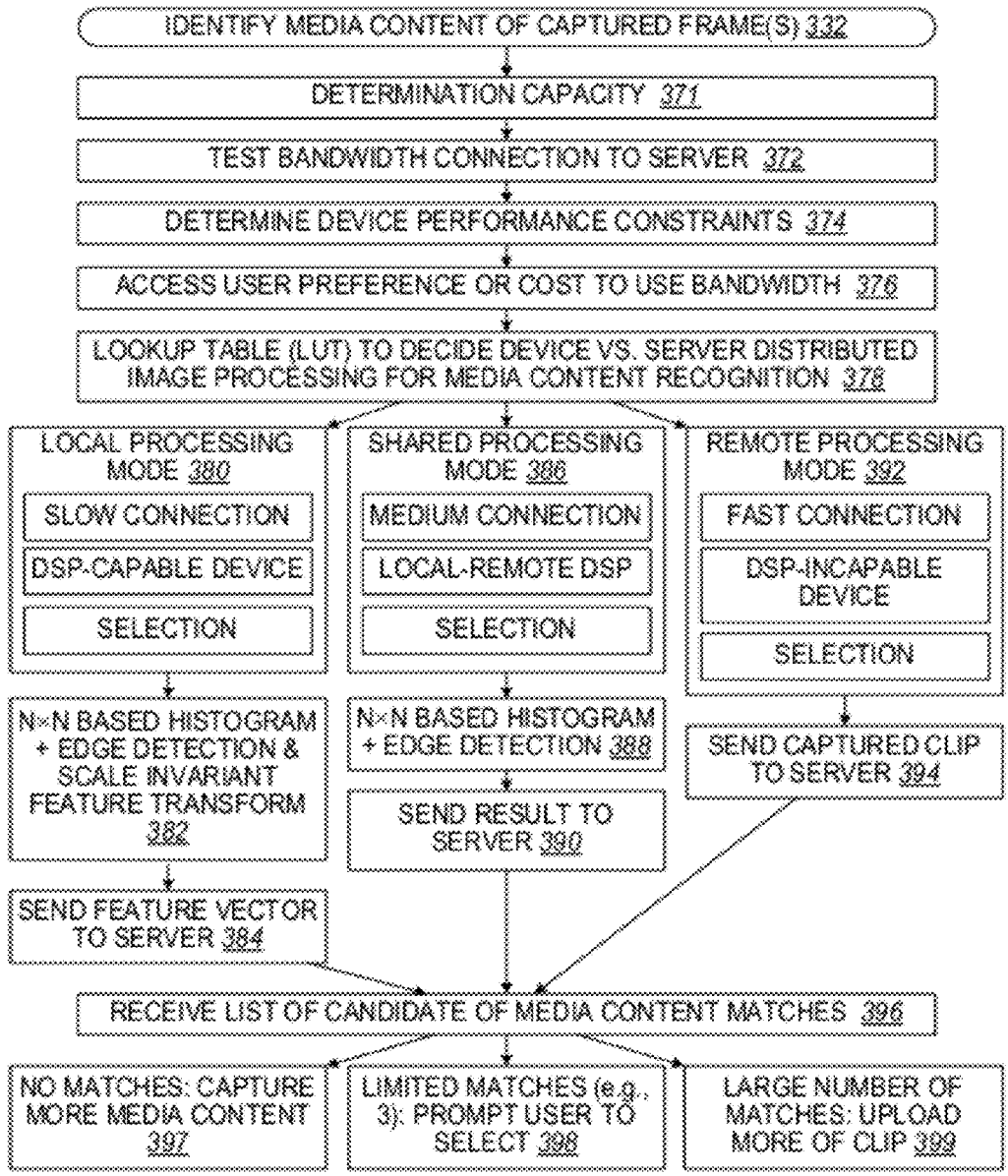
FIG. 3C illustrates a flow diagram of a methodology or sequence of operations for identifying media content of captured frames.

In one exemplary aspect, in FIGS. 3A-3C, a methodology or sequence of operations 300 is provided for capturing and identifying visual media content within a detected external display imaged by a camera. The user points a camera of a wireless mobile device toward a display or monitor (block 302). The user selects a user control for capturing image content (block 304).

In one aspect, the mobile device is enabled to capture one type of visual media content (e.g., text, a graphical image, video images). In another aspect, the mobile device can receive an indication as to what type of visual media content is to be captured or captured. As a further aspect, the mobile device can automatically determine the type of visual media content among several alternatives. To these ends, the mobile device can determine an intent or appropriateness for text capture (block 306). If so, the capture can be directed to high contrast, typically black and white, text with no inherent motion (block 308). The mobile device can also determine an intent or appropriateness for image capture (block 310). If so, the target can be color and of varied contrast, but also with no inherent motion (block 312). The mobile device can also determine intent/appropriateness for video capture (block 314). If so, the target can have inherent motion (block 316).

In an exemplary aspect, at block 317 a color conversion process supports these afore-mentioned determinations. Transforming from input color space, often RGB to Luminance-Chrominance space can be helpful because the system can determine the amount of color in an image. Amount of color in the image being studied can be determined based upon Cb and Cr being at a mid value in their range (e.g., 128) that indicates no color. Alternatively or in addition, particular colors such as white and black or blue can be detected that are indicative of printed matter. Alternatively or in addition, a solid background color can be detected that can be dropped in order to depend image or alphanumeric content. Alternatively or in addition, a Gabor filter can be used to determine whether the content has a regular pattern at some frequency, which might indicate text of a particular font size.

A quadrilateral image or video source can be found during camera preview at reduced resolution (block 318), which is discussed further with regard to FIG. 3B. With further reference to FIG. 3A, alternatively, sufficient processing capacity can exist to utilize a higher resolution initial capture. In a further aspect, the user can assist by touching a view-finder to focus attention on a portion of the camera preview (block 320). In another aspect, the mobile device displays the recognized source or displays candidate sources for user selection (block 322). If the latter, the user interface receives a user selection and proceeds to determine image/video source (block 324). If needed or enabled, the user can assist as prompted by aiming or focusing the camera or touching the view finder (block 326). In some implementations, the mobile device can send Region of Interest (ROI) to the camera for best resolution settings (block 328). The mobile device captures frame(s) from this area (block 330).

The media content of captured frame(s) is identified (block 332). In various aspects, this identification can be performed by the mobile device, by distributed processing between the mobile device and a remote server, or largely by the remote server as described further with reference to FIG. 3C. With continued reference to FIG. 3A, the mobile device can download media content (block 334).

In FIG. 3B, an exemplary methodology 318 is provided for finding the quadrilateral image/video source within an image (block 318). If using a lower camera preview resolution, the initial image or images can be at VGA resolution over "n" frames (n=1 for no motion) (block 336).

With further reference to FIG. 3B, a ROI map is created with 255 values where user input touched, which can be blurred for falloff (block 338). In some instance, detection can take advantage of a tendency for displays or monitors to have a brighter level of illumination than other surfaces in a room. To that end, a "glowing" ROI map is created by thresholding maximum illumination, such as defined by Red-Green-Value (RGB), for value>x (e.g., achieve 20% pixel remainder) (block 340). In some instances where video capture is intended, detection can take advantage of the fact that changes between frames exists to display motion. To that end, a "motion" ROI map is created by difference of every frame from "m" frames back (e.g., m=3). A maximum delta can be recorded to help remove jitter (block 342). The image from the viewfinder can be cropped based on the weights of ROI maps (block 344). The cropped image is fed to fast corner detector (block 346). Corner points (CP) can be clustered closer than threshold pixels (≈6) (block 348). CP can be pruned if in n×n area entirely within glowing map (block 350). CP can be pruned if motion in m×m area is entirely within glowing map (block 352).

Quadrilateral candidates are identified from pruned CPs (block 354):
  (i) Not convex (sum of angles 360°) (block 356);
  (ii) Any internal angle>110° (block 358);
  (iv) Video aspect ratio (4:3, 16:9) (block 360);
  (v) Area≥⅕sth of image (block 362);
  (vi) Two (2) equal adjacent angles (block 364); and
  (vii) Associate quadrilateral candidates based on depth finding (block 365).
Thus, groupings that are indicative of being associated in a shape typical of a monitor or display are identified.

With regard to the latter aspect of using depth finding, by using depth focus capabilities certain groups of corners can be determined to be a certain depth. Thereby, corners can be pruned based upon being in a foreground depth or a background depth deemed extraneous from a candidate set of corners. Depth information can be used to determine sets of corners that are at the same depth level in the image.

Additional disclosure regarding use of a depth finding is described in the co-pending U.S. patent application "System and Method to Generate Depth Data Using Edge Detection" by Babak Forutanpour, Ser. No. 12/185,887, filed on Aug. 5, 2008, Publication No. 20100033617 A1, assigned to the assignee hereof, and expressly incorporated by reference herein.

Candidate four (4) corners are added to a master list (block 366). Quadrilateral shapes formed from sets of corners in the master list are selected such that no large, false quadrilateral that encompasses substantially the entire image is allowed to close smaller quadrilaterals. For instance, no quadrilateral larger than one-fifth of the area of the image is allowed to close other candidate quadrilaterals. In an exemplary aspect, any quadrilateral that occupies 80% of another quadrilateral is pruned (block 368).

Corners can be pruned based upon detecting border shapes and uniform colors typical of monitors/displays (block 370). For another instance, the left and right halves of the quadrilateral histograms should match. Alternatively or in addition, the bottom and the top halves of the quadrilateral histograms should match. In an additional aspect, one bordering side is allowed to differ from its opposite bordering side to account for asymmetric placement of user controls, audio speakers, mounting or support structure, etc. In an exemplary aspect, matching can be computed by binned histograms for a side that is subtracted from the other side with a limit (e.g., 20%) of total pixels that can be different. Alternatively, if converted to Hue Saturation Value (HSV), the average hues can be limited to a low value (e.g., within 10%). In an exemplary aspect, any quadrilateral whose border (1/14th of width) has a histogram with a 1.5 value away from standard deviation is pruned.

By virtue of this exemplary identification, a quadrilateral corresponding to a display or monitor can be identified from the image.

In FIG. 3C, an exemplary methodology or sequence of operation 332 is provided for identifying media content of captured frame(s). Capacity to collaborate with a remote network is determined (block 371). For instance, this capacity can be limited due to available resources, interference, channel fading, transmit power limitations, subscribed usage limitations, etc. To adjust for some or all of these considerations, bandwidth can be tested for a connection to a server (block 372). Device performance constraints can be determined (e.g., Central Processing Unit (CPU) speed and availability, configuration of digital signal processing hardware/software, etc.) (block 374). User preferences or cost to use bandwidth can be accessed (block 376). A capacity constraint can also be a power limitation based upon either the power consumption for locally performing the image processing or the power required to transmit varying amounts of image data. A capacity constraint can also be related to an end-to-end time to process and transmit image data.

In some instances, one characteristic of capacity is determinative. For example, a low-performance mobile device can be incapable of performing additional digital image processing, thus necessitating upload of raw image data regardless of the channel limitations.

In another instance, a set of possible modes are determined based on what portions of the digital image processing can be performed locally or remotely. Then a selection can be made for an optimum solution based upon user preferences (e.g., cost to accomplish), system preferences for traffic optimization, or enhancing user experience by reducing the time to complete the digital image processing.

For instance, a Lookup Table (LUT) can be accessed to decide device versus server distributed image processing for media content recognition (block 378). Thus, in one aspect, a local processing mode is deemed appropriate. For example, a very slow connection is detected, a capable device is determined to be available, or this mode has been selected (block 380). An nxn based histogram+edge detection & Scale Invariant Feature Transform (SIFT) is performed (block 382). The feature vector is sent to the server in order to conserve bandwidth (block 384).

In another aspect, a shared processing mode is deemed appropriate. For example, a medium connection is detected, local and remote components are determined to be available for shared processing, or this mode has been selected (block 386). An nxn based histogram+edge detection is performed without performing SIFT (block 388). The result is sent to the server (block 390).

In an additional aspect, a remote processing mode is deemed appropriate. For example, a local device is determined to be incapable of performing the processing, a fast connection is determined to be available, or this mode has been selected (block 392). Rather than processing, the captured clip is sent to the server (block 394).

After the remote server has completed any remaining processing and has done a match against its catalogue of media content, the mobile device receives a list of candidate of media content matches (block 396). In one aspect, the constraints of presenting such matches on the mobile device are considered. In addition, assistance from the user may be required (e.g., additional aiming of the camera, interactions with the user interface, etc.) to uniquely identify the media content. To these ends, a determination can be made that no matches were made and that a need exists to capture more media content (block 397). Alternatively or in addition, limited matches can be determined (e.g., 3) that are suited for presentation on the user interface for user selection (block 398). Alternatively or in addition, a large number of matches may be identified. In response, the mobile device can capture more content or send a higher resolution version of the captured content for the server to use in its matching (block 399).

Figure 4:
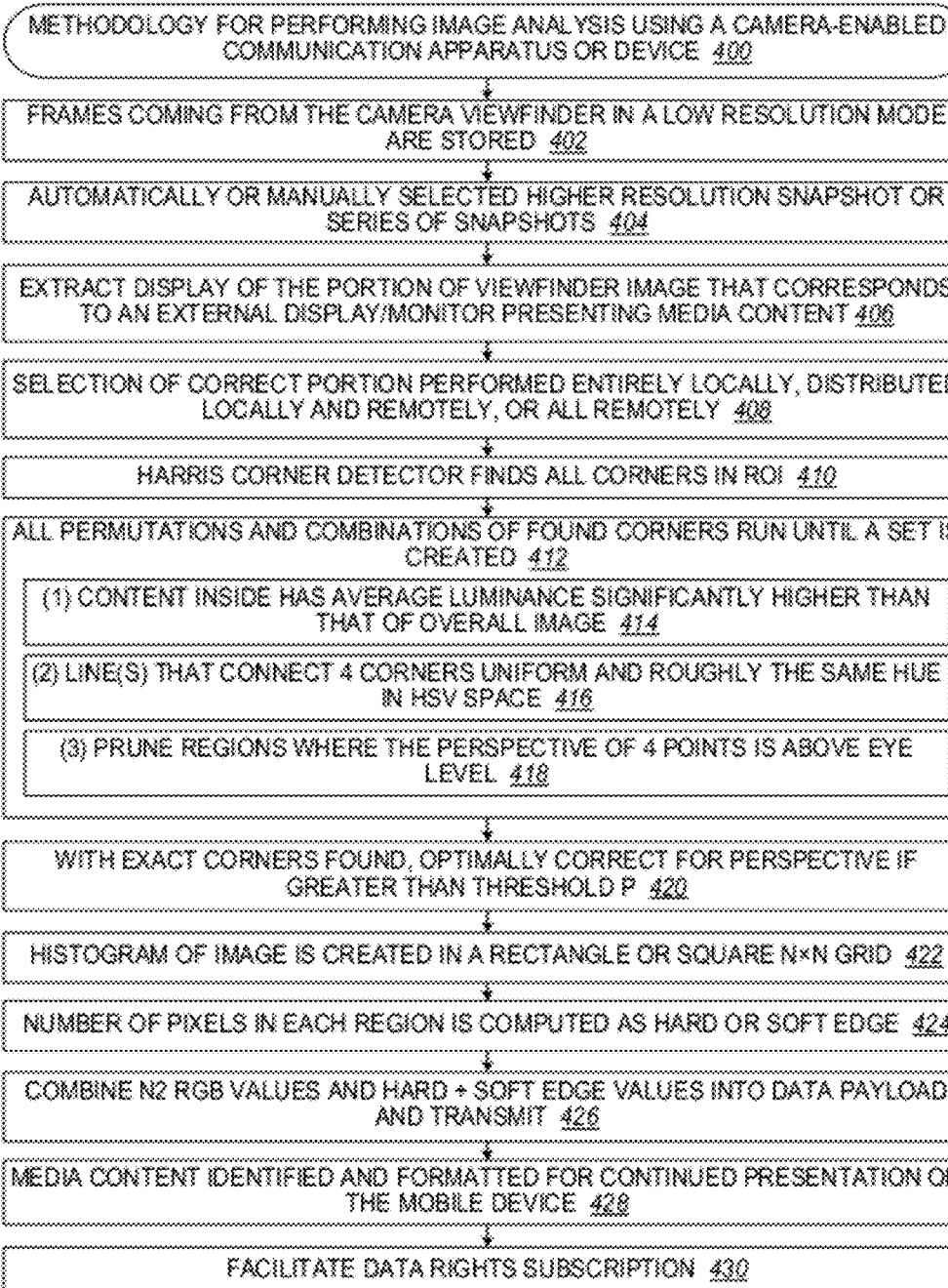
FIG. 4 illustrates an exemplary flow diagram of a methodology or sequence of operations for image analysis using a camera-enabled communication device.

In another exemplary aspect, in FIG. 4, a methodology 400 performs image analysis using a camera-enabled communication apparatus or device such as a smartphone. Frames coming from the camera viewfinder in a low resolution mode can be stored (block 402). Alternatively, the image analysis can be performed on an automatically or manually selected higher resolution snapshot or series of snapshots (block 404). An algorithm is executed that extracts the display of the portion of viewfinder image that corresponds to an external display or monitor that is presenting the media content (e.g., a television monitor) (block 406). For convenience, this region can be denoted as a Liquid Crystal Display (LCD) as a common display type for e-books, televisions and computers, although it should be appreciated that other technologies can be used consistent with aspects of the present innovation.

Figure 5:
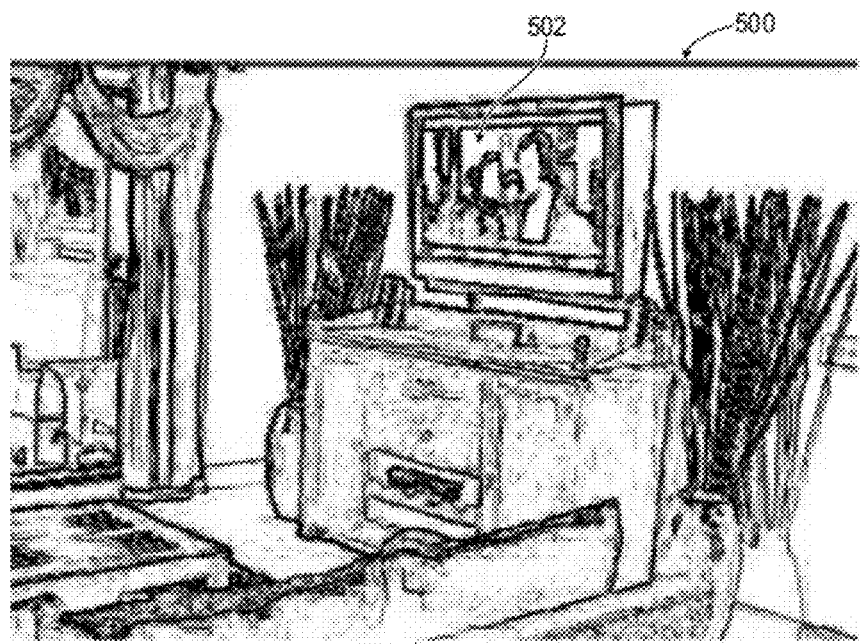
FIG. 5 illustrates a graphical depiction of an illustrative lower resolution image of a room that includes a display from a side perspective.

In FIG. 5, an illustrative lower resolution image 500 of a room includes a display 502 from a side perspective.

With further reference to FIG. 4, selection of the correct portion can in part involve performing a series of processes, either entirely locally, distributed locally and remotely, or all remotely (block 408).

For instance, Harris corner detector can be run to find all corners in a Region of Interest (ROI) (block 410). All permutations and combinations of found corners can be run until a set is created (block 412) whereby:

(1) The content inside that region has average luminance significantly higher than that of the overall image, the ratio denoted as 'l' (block 414).

(2) The line(s) that connect the 4 corners are uniform and roughly the same Hue in Hue Saturation Value (HSV) space (block 416). For instance, a check is made that border pixels of the monitor/display are roughly or substantially the same color with one pair or two pairs of opposing sides having approximately the same width. In one exemplary aspect, bordering pixels can be determined to have RGB matches with a threshold value of each other (e.g., 20%). The allowable border thickness can be based on LUT. For example, when the area in the quadrilateral is 1/10 of the image, the border should be 1/30th of the horizontal width of the images x-dimension. Thus, a 640×480 image would be expected to be a television with a border that is about 20 pixels wide.

(3) Prune regions where the perspective of the four (4) points does not match that of something at or below eye level (e.g., prune ceiling lights) (block 418).

Figure 6:
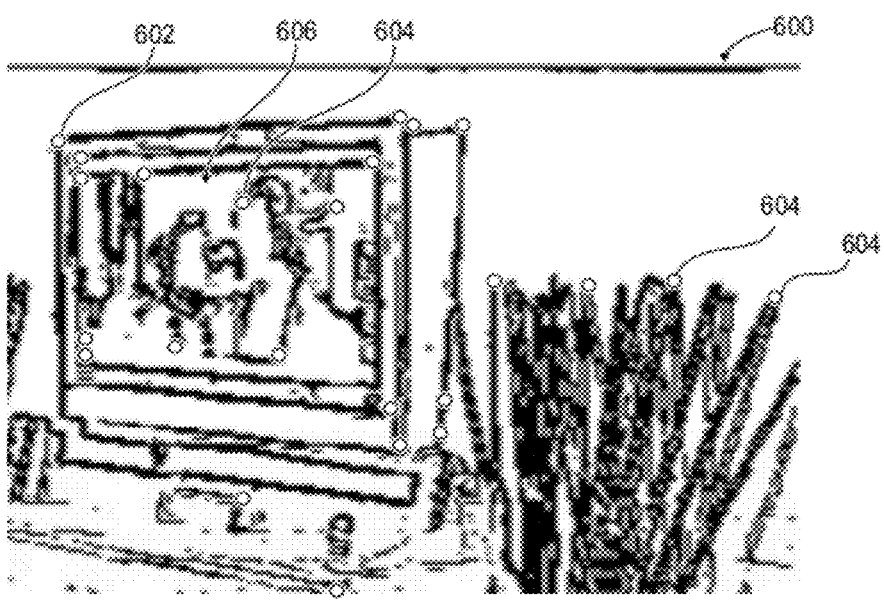
FIG. 6 illustrates a graphical depiction of an illustrative lower resolution image of a Region of Interest (ROI) portion of a room that has a number of detected corners as candidates for automatically defining the display.

In FIG. 6, an illustrative lower resolution image 600 of a ROI portion of a room that includes a display 602 from a side perspective has detected a number of corners 604 that can be candidates for automatically defining the display 602 so that media content 606 can be captured.

Figure 7:
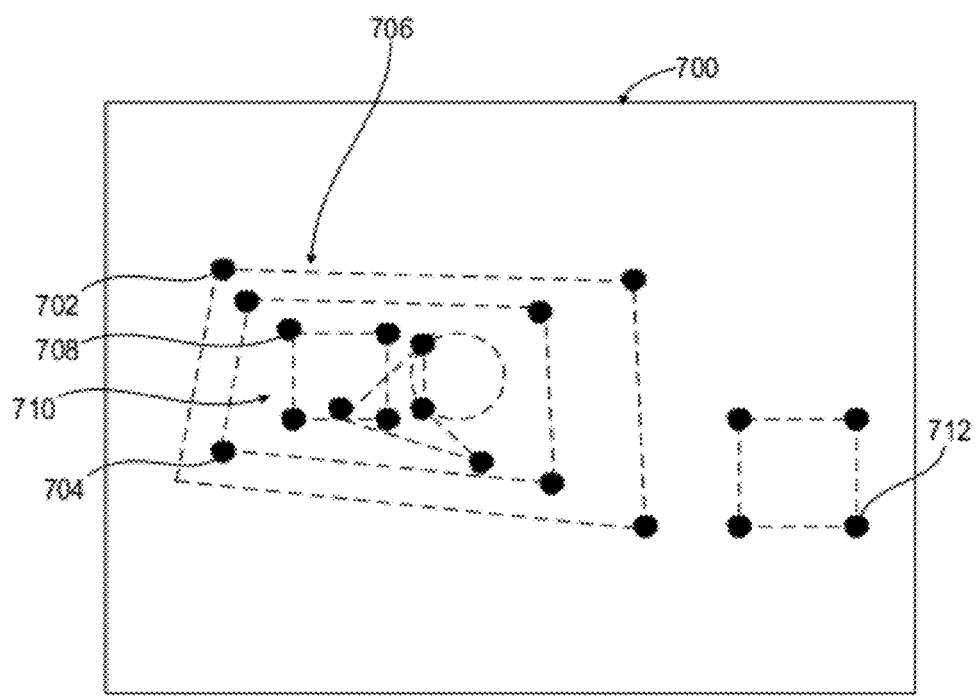
FIG. 7 illustrates a graphical depiction of a set of candidate clustered and pruned pixels derived from image analysis.

In FIG. 7, a set 700 of candidate pixels of a room derived from the corner detection includes points that define outer and inner points 702, 704 of a display 706 as well as image points 708 within the media content 710 and extraneous points 712 outside of the display 706 that need to be selectively pruned.

With further reference to FIG. 4, now that the exact corners of the LCD display are found, the smartphone can then optimally correct for the perspective if it is greater than some threshold p (block 420).

For example, the threshold p can be based upon a ratio of lengths of opposing lateral sides. For example, consider a ratio $p_1$ that indicates the lateral sides are within 90% of each other. It can be determined that the matching algorithm is sufficiently robust to achieve a match without correcting for the resulting distortion in the captured video image. For another example, consider a ratio $p_2$ that indicates the lateral sides are between 90% and 70% of each other. Correction may be required to correct for distortion due to the perspective in this range. For an additional example, consider a ratio $p_3$ that indicates the lateral sides are relatively more out of scale with each other that precludes correction and brings into doubt whether an appropriate quadrilateral has been found. The user is assumed to not attempt capture at this nonorthogonal angle. It should further be appreciated that different thresholds can be used vertical versus horizontal perspective.

In one aspect, any rotation of the image from an orthogonal plane relative to the point of view of the camera can be corrected. A pair of parallel lines can be found (i.e. top/bottom, or left/right side) and entire image is digitally rotated so these two lines are either 0 or 90 relative to image, whichever angle is closer to that computed.

The histogram of the image is created in a rectangle or square n×n grid, e.g., n=3 (block 422).

The number of pixels in each region is computed as hard or soft edge (block 424). Various definitions can be employed for hard (sharp) edges and for soft (blurry) edges. For example, a "hard edge" pixel is one whose neighboring values up to n pixels away (e.g., n=2, in all directions) have value significantly greater than, or less than, the pixels own value, e.g., threshold>120. A pixel is on a "soft edge" if its value is between two neighbors who have different values from one another. The sharpness of the change in the image can indicate discontinuities in depth, discontinuities in surface orientation, changes in material properties, or variations in scene illumination.

Combine the $n^2$ Red Green Blue (RGB) values and hard+soft edge values into data payload and transmit (block 426). By sending the server not only color information, but also the number of hard/soft pixels, the server can use this information to scan frames from its library of movies for blocks that have similar characteristics. In short, sending just the color information may be insufficient. It may not be enough to know how much red/green/blue a block has. An improved filter can utilize where in the image block there is more RGB. For instance, by also sending that this block has 45 pixels on a hard edge and 39 on a soft edge the list of candidates can be narrowed down. In an ideal situation without transmission or processing limits, the entire block can be sent so that the server can subtract the two images, frame by frame.

The media content (e.g., movie, television, news article, radio broadcast, podcast program, etc.) is identified and formatted for continued presentation on the mobile device (block 428). Data rights subscription can be facilitated if the user has insufficient rights to consume (block 430).

By virtue of the foregoing, a convenient way is provided for a user to continue consuming particular media content via a mobile device without a laborious process of identifying, locating and accessing this content via a mobile device.

Figure 8:
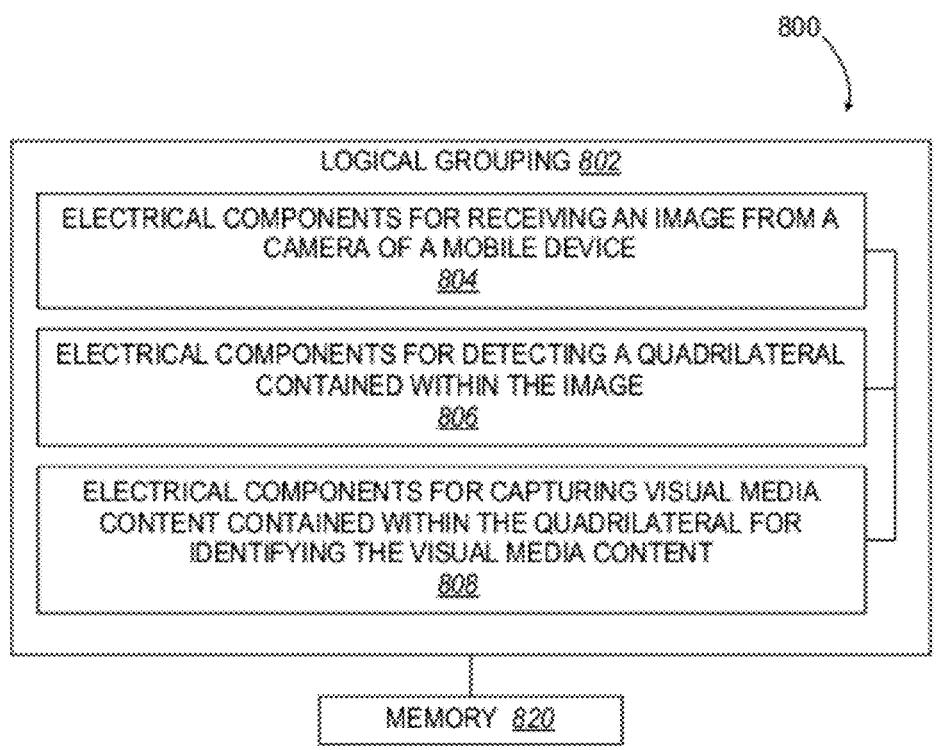
FIG. 8 illustrates a schematic diagram of a system for identifying visual media content.

With reference to FIG. 8, illustrated is a system 800 for identifying visual media content. For example, system 800 can reside at least partially within user equipment (UE). It is to be appreciated that system 800 is represented as including functional blocks, which can be functional blocks that represent functions implemented by a computing platform, processor, software, or combination thereof (e.g., firmware). System 800 includes a logical grouping 802 of electrical components that can act in conjunction. For instance, logical grouping 802 can include an electrical component 804 for receiving an image from a camera of a mobile device. Moreover, logical grouping 802 can include an electrical component 806 for detecting a quadrilateral contained within the image. For another instance, logical grouping 802 can include an electrical component 808 for capturing visual media content contained within the quadrilateral for identifying the visual media content. Additionally, system 800 can include a memory 820 that retains instructions for executing functions associated with electrical components 804-808. While shown as being external to memory 820, it is to be understood that one or more of electrical components 804-808 can exist within memory 820.

Figure 9:
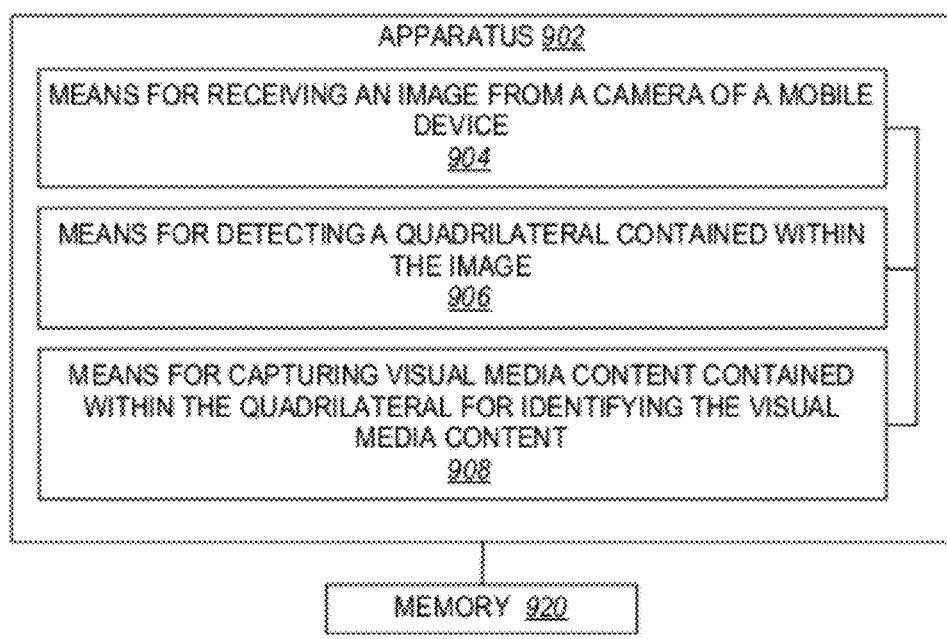
FIG. 9 illustrates a schematic diagram of an apparatus having means for identifying visual media content.

In FIG. 9, an apparatus 902 is depicted for identifying visual media content. Means 904 are provided for receiving an image from a camera of a mobile device. Means 906 are provided for detecting a quadrilateral contained within the image. Means 908 are provided for capturing visual media content contained within the quadrilateral for identifying the visual media content.

Figure 10:
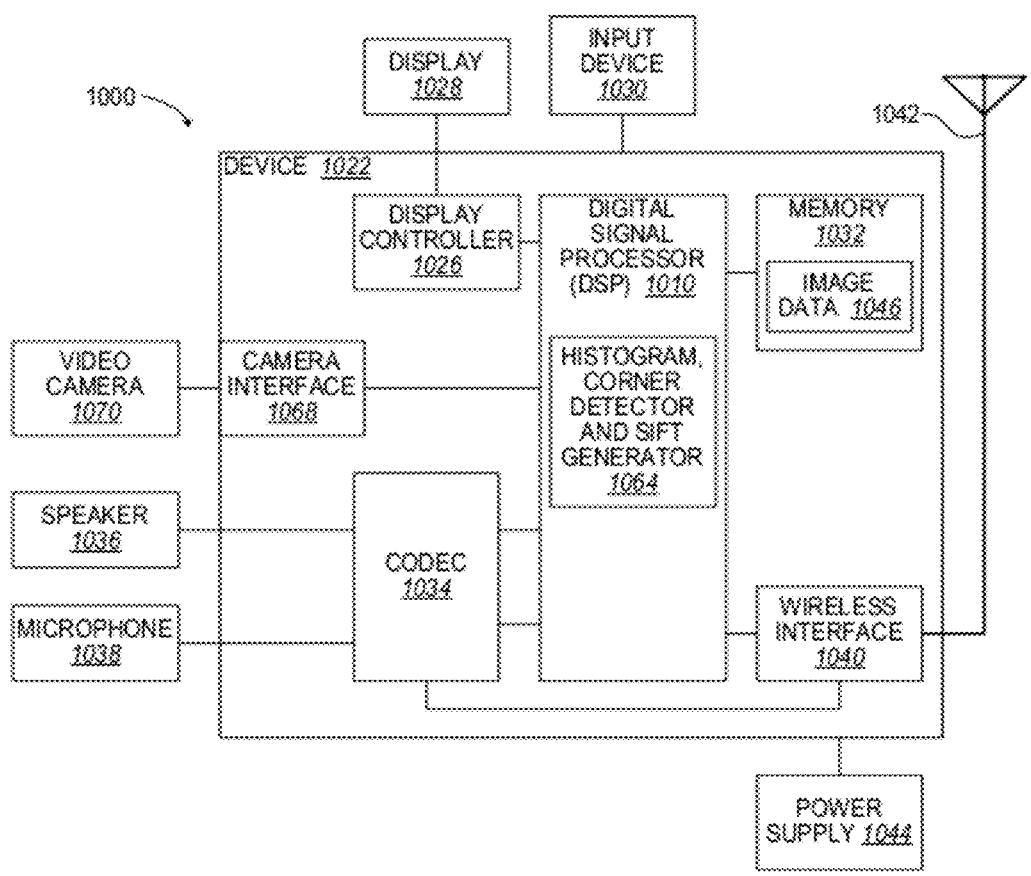
FIG. 10 is a block diagram of mobile device including a histogram, corner detector and Scale Invariant Feature Transform (SIFT) generator.

FIG. 10 is a block diagram of a particular mobile device 1000 including a histogram, corner detector and Scale Invariant Feature Transform (SIFT) generator 1064. The mobile device 1000 may be implemented in a portable electronic device and includes a signal processor 1010, such as a digital signal processor (DSP), coupled to a memory 1032. The histogram, corner detector and Scale Invariant Feature Transform (SIFT) generator 1064 is included in the signal processor 1010. In an illustrative example, the corner detector and SIFT generator 1064 operates as described in accordance with FIGS. 1-7, or any combination thereof.

A camera interface 1068 is coupled to the signal processor 1010 and also coupled to a camera, such as a video camera 1070. The camera interface 1068 may be adapted to take multiple images of a scene in response to a single image capture command, such as a from a user "clicking" a shutter control or other image capture input, either automatically or in response to a signal generated by the DSP 1010. A display controller 1026 is coupled to the signal processor 1010 and to a display device 1028. A coder/decoder (CODEC) 1034 can also be coupled to the signal processor 1010. A speaker 1036 and a microphone 1038 can be coupled to the CODEC 1034. A wireless interface 1040 can be coupled to the signal processor 1010 and to a wireless antenna 1042.

The signal processor 1010 is adapted to detect corners in image data based on changes in intensity values between neighboring data points as previously described. The signal processor 1010 is also adapted to generate image data 1046, such as a depth map or other form of depth data, derived with image data sets as previously described. By using depth focus capabilities, certain groups of corners can be determined to be a certain depth. Thereby, corners can be pruned based upon being in a foreground depth or a background depth deemed extraneous from a candidate set of corners. In an exemplary aspect, besides using glow and motion ROI maps, the camera can sweep the lens looking for a focus level when objects are blurry or sharp. Based on this information, determinations can be made as to whether no edges, soft edges or hard edges are present. Corners at the same depth can be deemed coplanar. Alternatively, three-dimensional coordinates can be determined for corners based in part upon depth information in order to determine coplanar points that are not perpendicular with respect to the camera.

The image data may include video data from the video camera 1070, image data from a wireless transmission via the antenna 1042, or from other sources such as an external device coupled via a universal serial bus (USB) interface (not shown), as illustrative, non-limiting examples.

The display controller 1026 is configured to receive the processed image data and to provide the processed image data to the display device 1028. In addition, the memory 1032 may be configured to receive and to store the processed image data, and the wireless interface 1040 may be configured to receive the processed image data for transmission via the antenna 1042.

In a particular embodiment, the signal processor 1010, the display controller 1026, the memory 1032, the CODEC 1034, the wireless interface 1040, and the camera interface 1068 are included in a system-in-package or system-on-chip device 1022. In a particular embodiment, an input device 1030 and a power supply 1044 are coupled to the mobile system-on-chip device 1022. Moreover, in a particular embodiment, as illustrated in FIG. 10, the display device 1028, the input device 1030, the speaker 1036, the microphone 1038, the wireless antenna 1042, the video camera 1070, and the power supply 1044 are external to the system-on-chip device 1022. However, each of the display device 1028, the input device 1030, the speaker 1036, the microphone 1038, the wireless antenna 1042, the video camera 1070, and the power supply 1044 can be coupled to a component of the system-on-chip device 1022, such as an interface or a controller.

In an exemplary aspect, a mobile device can utilize a Multiple Input Multiple Output (MIMO) cellular communication capability for performing media content identification and delivery. In an exemplary aspect, A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 11:
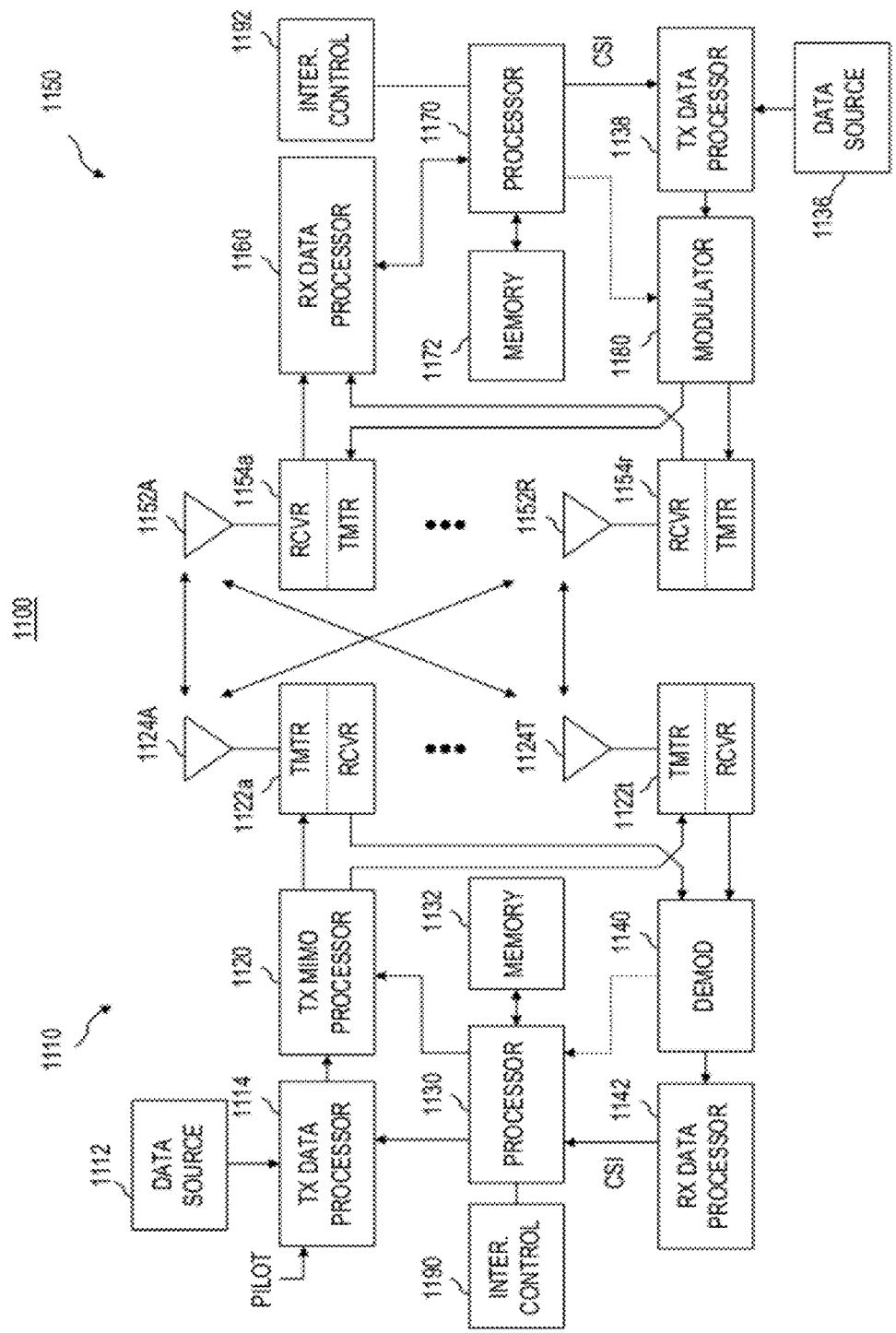
FIG. 11 illustrates a schematic diagram of communication components that may include one or more components that perform interference control operations.

The teachings herein may be incorporated into a node (e.g., a device) employing various components for communicating with at least one other node. FIG. 11 depicts several sample components that may be employed to facilitate communication between nodes. Specifically, FIG. 11 illustrates a wireless device 1110 (e.g., an access point) and a wireless device 1150 (e.g., an access terminal) of a MIMO system 1100. At the device 1110, traffic data for a number of data streams is provided from a data source 1112 to a transmit ("TX") data processor 1114.

In some aspects, each data stream is transmitted over a respective transmit antenna. The TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides $N_T$ modulation symbol streams to $N_T$ transceivers ("XCVR") 1122a through 1122t that each has a transmitter (TMTR) and receiver (RCVR). In some aspects, the TX MIMO processor 1120 applies beam-forming weights to the symbols of the data streams and to the antenna from which the symbol is being transmitted.

Each transceiver 1122a-1122t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1122a through 1122t are then transmitted from $N_T$ antennas 1124a through 1124t, respectively.

At the device 1150, the transmitted modulated signals are received by $N_R$ antennas 1152a through 1152r and the received signal from each antenna 1152a-1152r is provided to a respective transceiver ("XCVR") 1154a through 1154r. Each transceiver 1154a-1154r conditions (e.g., filters, amplifies, and downconverts) a respective received signal, digitizes the conditioned signal to provide samples, and further processes the samples to provide a corresponding "received" symbol stream.

A receive ("RX") data processor 1160 then receives and processes the $N_R$ received symbol streams from $N_R$ transceivers 1154a-1154r based on a particular receiver processing technique to provide $N_T$ "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which pre-coding matrix to use. The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154a through 1154r, and transmitted back to the device 1110.

At the device 1110, the modulated signals from the device 1150 are received by the antennas 1124a-1124t, conditioned by the transceivers 1122a-1122t, demodulated by a demodulator ("DEMOD") 1140, and processed by a RX data processor 1142 to extract the reverse link message transmitted by the device 1150. The processor 1130 then determines which precoding matrix to use for determining the beam-forming weights then processes the extracted message.

FIG. 11 also illustrates that the communication components may include one or more components that image data communication in the presence of interference. For example, an interference ("INTER.") control component 1190 may cooperate with the processor 1130 and/or other components of the device 1110 to send/receive signals to/from another device (e.g., device 1150). Similarly, an interference control component 1192 may cooperate with the processor 1170 and/or other components of the device 1150 to send/receive signals to/from another device (e.g., device 1110). It should be appreciated that for each device 1110 and 1150 the functionality of two or more of the described components may be provided by a single component. For example, a single processing component may provide the functionality of the interference control component 1190 and the processor 1130 and a single processing component may provide the functionality of the interference control component 1192 and the processor 1170.

Figure 12:
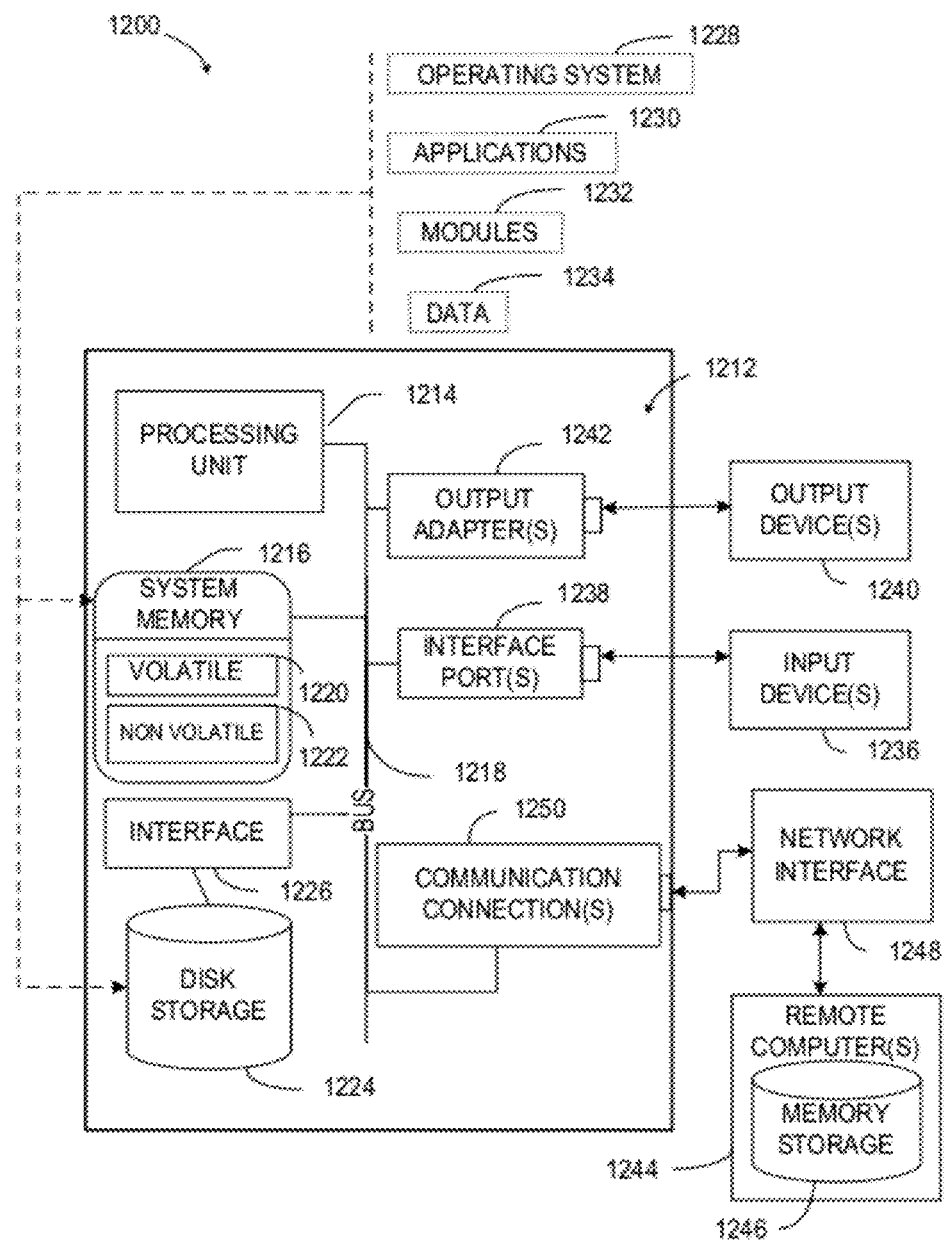
FIG. 12 illustrates a schematic diagram of an exemplary computing environment.

With reference to FIG. 12, an exemplary computing environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1294), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Variations, modification, and other implementations of what is described herein will occur to those of ordinary skill in the art without departing from the spirit and scope of the disclosure as claimed. Accordingly, the disclosure is to be defined not by the preceding illustrative description but instead by the spirit and scope of the following claims.

It should be apparent that the teaching herein can be embodied in a wide variety of forms and that any specific structure or function disclosed herein is merely representative. Based on the teachings herein one skilled in the art should appreciate that an aspect disclosed herein can be implemented independently of other aspects and that two or more of these aspects can be combined in various ways. For example, an apparatus can be implemented or a method practiced using any number of the aspects set forth herein. In addition, an apparatus can be implemented or a method practiced using other structure or functionality in addition to or other than one or more of the aspects set forth herein. As an example, many of the methods, devices, systems, and apparatuses described herein are described in the context of providing dynamic queries and recommendations in a mobile communication environment. One skilled in the art should appreciate that similar techniques could apply to other communication and non-communication environments as well.

As used in this disclosure, the term "content" and "objects" are used to describe any type of application, multimedia file, image file, executable, program, web page, script, document, presentation, message, data, meta-data, or any other type of media or information that may be rendered, processed, or executed on a device.

As used in this disclosure, the terms "component," "system," "module," and the like are intended to refer to a computer-related entity, either hardware, software, software in execution, firmware, middle ware, microcode, or any combination thereof. For example, a component can be, but is not limited to being, a process running on a processor, a processor, an object, an executable, a thread of execution, a program, or a computer. One or more components can reside within a process or thread of execution and a component can be localized on one computer or distributed between two or more computers. Further, these components can execute from various computer readable media having various data structures stored thereon. The components can communicate by way of local or remote processes such as in accordance with a signal having one or more data packets (e.g., data from one component interacting with another component in a local system, distributed system, or across a network such as the Internet with other systems by way of the signal). Additionally, components of systems described herein can be rearranged or complemented by additional components in order to facilitate achieving the various aspects, goals, advantages, etc., described with regard thereto, and are not limited to the precise configurations set forth in a given figure, as will be appreciated by one skilled in the art.

Additionally, the various illustrative logics, logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the operations or actions described herein.

Moreover, various aspects or features described herein can be implemented as a method, apparatus, or article of manufacture using standard programming or engineering techniques. Further, the operations or actions of a method or algorithm described in connection with the aspects disclosed herein can be embodied directly in hardware, in a software module executed by a processor, or in a combination of the two. Additionally, in some aspects, the operations or actions of a method or algorithm can reside as at least one or any combination or set of codes or instructions on a machine-readable medium or computer readable medium, which can be incorporated into a computer program product. Further, the term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally, various storage media described herein can represent one or more devices or other machine-readable media for storing information. The term "machine-readable medium" can include, without being limited to, wireless channels and various other media capable of storing, containing, or carrying instruction, or data.

Furthermore, various aspects are described herein in connection with a mobile device. A mobile device can also be called a system, a subscriber unit, a subscriber station, mobile station, mobile, mobile device, cellular device, multi-mode device, remote station, remote terminal, access terminal, user terminal, user agent, a user device, or user equipment, or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In addition to the foregoing, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. Furthermore, as used in this application and the appended claims, the term "or" is intended to mean an inclusive "or" rather than an exclusive "or." That is, unless specified otherwise, or clear from context, "X employs A or B" is intended to mean any of the natural inclusive permutations. That is, in this example, X could employ A, or X could employ B, or X could employ both A and B, and thus the statement "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or deducing states of a system, environment, or user from a set of observations as captured via events or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events or data. Such inference results in the construction of new events or actions from a set of observed events or stored event data, whether or not the events are correlated in close temporal proximity, and whether the events and data come from one or several event and data sources.

What is claimed is:

1. A method for identifying visual media content, comprising:
   receiving an image from a camera of a mobile device;
   recognizing a border of a rectangular display device within the image, wherein the border has a common border thickness;
   detecting a quadrilateral contained within the image based on recognizing the border; and
   capturing visual media content contained within the quadrilateral for identifying the visual media content.

2. The method of claim 1, wherein capturing the visual media content contained within the quadrilateral for identifying the visual media content further comprises performing text recognition.

3. The method of claim 1, wherein capturing the visual media content contained within the quadrilateral for identifying the visual media content further comprises performing image recognition for static visual media content.

4. The method of claim 1, wherein detecting the quadrilateral contained within the image further comprises receiving a user input relative to a portion of a viewfinder depiction of the image.

5. The method of claim 1, wherein receiving the image from the camera of the mobile device further comprises receiving a sequential plurality of frames, and wherein capturing the visual media content contained within the quadrilateral for identifying the visual media content further comprises performing video image recognition for dynamic visual media content.

6. The method of claim 5, wherein detecting the quadrilateral contained within the image further comprises creating a motion map by determining a difference between the sequential plurality of frames.

7. The method of claim 6, further comprising:
   performing corner detection; and
   pruning a corner point within the motion map.

8. The method of claim 1, wherein detecting the quadrilateral contained within the image further comprises cropping the image to encompass a region of interest map.

9. The method of claim 1, wherein detecting the quadrilateral contained within the image further comprises creating a glowing map by detecting a portion having a brighter illumination.

10. The method of claim 9, wherein detecting the quadrilateral contained within the image further comprises:
    performing corner detection; clustering corner points; and
    pruning a cluster of corner points within the glowing map.

11. The method of claim 1, wherein detecting the quadrilateral contained within the image further comprises creating a depth map by detecting depth of focus for portions of the image.

12. The method of claim 1, wherein detecting the quadrilateral contained within the image further comprises detecting a candidate quadrilateral shape of a selected four clusters of corner points that satisfies a recognition criteria for identifying a perspective view of the rectangular display device.

13. The method of claim 12, wherein identifying the perspective view of the rectangular display device further comprises pruning any candidate quadrilateral shape that occupies a majority area of another quadrilateral by determining whether the candidate quadrilateral shape is sufficiently big to encompass all other candidate quadrilateral shapes.

14. The method of claim 12, wherein identifying the perspective view of the rectangular display device further comprises determining that the candidate quadrilateral shape satisfies more than one criteria consisting of not being convex, having all internal angles being greater than 110 degrees, has an area that occupies a substantial portion of the image, has an aspect ratio approximating a standard video aspect ratio, and has two adjacent angles of approximately the same angle.

15. The method of claim 1, wherein recognizing the border for the rectangular display device further comprises detecting the common border thickness for portions of the border on opposing sides.

16. The method of claim 15, wherein detecting the common border thickness for portions of the border on opposing sides comprises detecting a thickness of a percentage of an encompassed dimension of the rectangular display device.

17. The method of claim 1, wherein recognizing the border for the rectangular display device further comprises detecting a common color for a substantial portion of the border on opposing sides to be common.

18. The method of claim 17, wherein detecting the common color for a substantial portion of the border on opposing sides to be common further comprises detecting that at least a percentage of a plurality of pixels have the common color.

19. The method of claim 1, further comprising performing a histogram analysis, edge detection and scale invariant feature transform on a portion of the image within a selected quadrilateral to identify corresponding media content.

20. The method of claim 1, further comprising:
    determining an image processing constraint; and
    distributing image processing of a portion of the image within the quadrilateral between the mobile device and a remote server in response to the image processing constraint.

21. The method of claim 20, wherein the image processing constraint comprises a capability of the mobile device to perform the imaging processing.

22. The method of claim 20, wherein the image processing constraint comprises at least in part a data transmission cost for transmitting via a transmission channel from the mobile device to the remote processing.

23. The method of claim 20, wherein the image processing constraint comprises a capability of a transmission channel from the mobile device to the remote processing.

24. The method of claim 23, wherein distributing the image processing of the portion of the image further comprises:
transmitting image data comprising an image clip in response to determining a high capability of the transmission channel;
transmitting the image data comprising the image clip after partial image processing in response to determining a medium capability of the transmission channel; and
transmitting the image data comprising the image clip after full image processing in response to determining a low capability of the transmission channel.

25. The method of claim 1, further comprising:
transmitting image data derived from a portion of the image within the quadrilateral to a remote server; and
receiving a report from the remote server for any matches of the image data to a repository of media content.

26. The method of claim 25, wherein receiving the report from the remote server for any matches further comprises:
determining that no matches were identified; and
repeating receiving an image from a camera of a mobile device, detecting a quadrilateral contained within the image, and capturing visual media content contained within the quadrilateral for identifying the visual media content to obtain convex additional image data to transmit to the remote server.

27. The method of claim 25, wherein receiving the report from the remote server for any matches further comprises:
determining that a number of matches derived from the report have a size appropriate for presenting on a user interface of the mobile device; and
receiving a user selection for one of a listing of media content derived from the report and presented on the user interface.

28. The method of claim 25, wherein receiving the report from the remote server for any matches further comprises:
determining that a number of matches derived from the report has a size larger than appropriate for presenting on a user interface of the mobile device; and
transmitting an image clip in response to the remote server for additional image processing.

29. The method of claim 25, further comprising receiving matching media content for presenting by the mobile device.

30. The method of claim 29, further comprising presenting the matching media content from a point identified in the visual media content.

31. The method of claim 29, further comprising reformatting the matching media content for a user interface of the mobile device.

32. The method of claim 29, further comprising transmitting an identifier for a user interface of the mobile device to prompt reformatting the matching media content.

33. The method of claim 29, further comprising negotiating data management rights to present the matching media content.

34. The method of claim 1, further comprising:
receiving audio captured by a microphone; and
using a hash lookup function to assist matching image data to a repository of media content.

35. The method of claim 1, wherein detecting the quadrilateral contained within the image further comprises creating a region of interest map that identifies significant details within the image based upon object contrast.

36. At least one processor for identifying visual media content, comprising:
a first module for receiving an image from a camera of a mobile device;
a second module for recognizing a border of a rectangular display device within the image, wherein the border has a common border thickness;
a third module for detecting a quadrilateral contained within the image based on recognizing the border; and
a fourth module for capturing visual media content contained within the quadrilateral for identifying the visual media content.

37. A computer program product for identifying visual media content, comprising:
a non-transitory computer-readable storage medium comprising:
a first set of codes for causing a computer to receive an image from a camera of a mobile device;
a second set of codes for causing the computer to recognize a border of a rectangular display device within the image, wherein the border has a common border thickness;
a third set of codes for causing the computer to detect a quadrilateral contained within the image based on recognizing the border; and
a fourth set of codes for causing the computer to capture visual media content contained within the quadrilateral for identifying the visual media content.

38. An apparatus for identifying visual media content, comprising:
means for receiving an image from a camera of a mobile device;
means for recognizing a border of a rectangular display device within the image, wherein the border has a common border thickness;
means for detecting a quadrilateral contained within the image based on recognizing the border; and
means for capturing visual media content contained within the quadrilateral for identifying the visual media content.

39. An apparatus for identifying visual media content, comprising:
a camera of a mobile device for generating an image; and
a computing platform for recognizing a border of a rectangular display device within the image, wherein the border has a common border thickness, for detecting a quadrilateral contained within the image received from the camera based on recognizing the border, and for capturing visual media content contained within the quadrilateral for identifying the visual media content.

40. The apparatus of claim 39, wherein the computing platform is further for capturing the visual media content contained within the quadrilateral for identifying the visual media content by performing text recognition.

41. The apparatus of claim 39, wherein the computing platform is further for capturing the visual media content contained within the quadrilateral for identifying the visual media content by performing image recognition for static visual media content.

42. The apparatus of claim 39, wherein the computing platform is further for detecting the quadrilateral contained within the image by receiving a user input relative to a portion of a viewfinder depiction of the image.

43. The apparatus of claim 39, wherein the computing platform is further for receiving the image from the camera of the mobile device by receiving a sequential plurality of frames, and wherein capturing the visual media content contained within the quadrilateral for identifying the visual media content further comprises performing video image recognition for dynamic visual media content.

44. The apparatus of claim 43, wherein the computing platform is further for detecting the quadrilateral contained within the image by creating a motion map by determining a difference between the sequential plurality of frames.

45. The apparatus of claim 44, wherein the computing platform is further for:
performing corner detection; and
pruning a corner point within the motion map.

46. The apparatus of claim 39, wherein the computing platform is further for detecting the quadrilateral contained within the image by cropping the image to encompass a region of interest map.

47. The apparatus of claim 39, wherein the computing platform is further for detecting the quadrilateral contained within the image by creating a glowing map by detecting a portion having a brighter illumination.

48. The apparatus of claim 47, wherein the computing platform is further for detecting the quadrilateral contained within the image by:
performing corner detection; clustering corner points; and pruning a cluster of corner points within the glowing map.

49. The apparatus of claim 39, wherein the computing platform is further for detecting the quadrilateral contained within the image by creating a depth map by detecting depth of focus for portions of the image.

50. The apparatus of claim 39, wherein the computing platform is further for detecting the quadrilateral contained within the image by detecting a candidate quadrilateral shape of a selected four clusters of corner points that satisfies a recognition criteria for identifying a perspective view of the rectangular display device.

51. The apparatus of claim 50, wherein the computing platform is further for identifying the perspective view of the rectangular display device by pruning any candidate quadrilateral shape that occupies a majority area of another quadrilateral by determining whether the candidate quadrilateral shape is sufficiently big to encompass all other candidate quadrilateral shapes.

52. The apparatus of claim 50, wherein the computing platform is further for identifying the perspective view of the rectangular display device by recognizing the border of the rectangular display device.

53. The apparatus of claim 50, wherein the computing platform is further for identifying the perspective view of the rectangular display device by determining that the candidate quadrilateral shape satisfies more than one criteria consisting of not being convex, having all internal angles being greater than 110 degrees, has an area that occupies a substantial portion of the image, has an aspect ratio approximating a standard video aspect ratio, and has two adjacent angles of approximately the same angle.

54. The apparatus of claim 39, wherein the computing platform is further for recognizing the border for the rectangular display device by detecting the common border thickness for portions of the border on opposing sides.

55. The apparatus of claim 54, wherein the computing platform is further for detecting the common border thickness for portions of the border on opposing sides by detecting a thickness of a percentage of an encompassed dimension of the rectangular display device.

56. The apparatus of claim 39, wherein the computing platform is further for recognizing the border for the rectangular display device by detecting a common color for a substantial portion of the border on opposing sides to be common.

57. The apparatus of claim 56, wherein the computing platform is further for detecting the common color for a substantial portion of the border on opposing sides to be common by detecting that at least a percentage of a plurality of pixels has the common color.

58. The apparatus of claim 39, wherein the computing platform is further for performing a histogram analysis, edge detection and scale invariant feature transform on a portion of the image within a selected quadrilateral to identify corresponding media content.

59. The apparatus of claim 58, further comprising a microphone for capturing audio,
wherein the computing platform is further for using a hash lookup function to assist matching image data to a repository of media content.

60. The apparatus of claim 39, wherein the computing platform is further for determining an image processing constraint, and for distributing image processing of a portion of the image within the quadrilateral between the mobile device and a remote server in response to the image processing constraint.

61. The apparatus of claim 60, wherein the image processing constraint comprises a capability of the mobile device to perform the imaging processing.

62. The apparatus of claim 60, wherein the image processing constraint comprises at least in part a data transmission cost for transmitting via a transmission channel from the mobile device to the remote processing.

63. The apparatus of claim 60, wherein the image processing constraint comprises a capability of a transmission channel from the mobile device to the remote processing.

64. The apparatus of claim 63, further comprising a transmitter for:
transmitting image data comprising an image clip in response to determining a high capability of the transmission channel;
transmitting the image data comprising the image clip after partial image processing in response to determining a medium capability of the transmission channel; and
transmitting the image data comprising the image clip after full image processing in response to determining a low capability of the transmission channel.

65. The apparatus of claim 39, further comprising:
a transmitter for transmitting image data derived from a portion of the image within the quadrilateral to a remote server; and
a receiver for receiving a report from the remote server for any matches of the image data to a repository of media content.

66. The apparatus of claim 65, wherein the computing platform is further for responding to the receiver receiving the report from the remote server for any matches by:
determining that no matches were identified; and
repeating receiving an image from a camera of a mobile device, detecting a quadrilateral contained within the image, and capturing visual media content contained within the quadrilateral for identifying the visual media content to obtain additional image data to transmit to the remote server.

67. The apparatus of claim 65, wherein the computing platform is further for responding to the receiver receiving the report from the remote server for any matches by:
determining that a number of matches derived from the report have a size appropriate for presenting on a user interface of the mobile device; and receiving a user selection for one of a listing of media content derived from the report and presented on the user interface.

68. The apparatus of claim 65, wherein the computing platform is further for responding to the receiver receiving the report from the remote server for any matches by:
  determining that a number of matches derived from the report has a size larger than appropriate for presenting on a user interface of the mobile device; and
  transmitting an image clip in response to the remote server for additional image processing.

69. The apparatus of claim 65, wherein the receiver is further for receiving matching media content for presenting by the mobile device.

70. The apparatus of claim 69, wherein the computing platform is further for presenting the matching media content from a point identified in the visual media content.

71. The apparatus of claim 69, wherein the computing platform is further for reformatting the matching media content for a user interface of the mobile device.

72. The apparatus of claim 69, wherein the transmitter is further for transmitting an identifier for a user interface of the mobile device to prompt reformatting the matching media content.

73. The apparatus of claim 69, wherein the computing platform via the transmitter and receiver is further for negotiating data management rights to present the matching media content.

74. A method for identifying visual media content, comprising:
  receiving an image from a camera of a mobile device;
  detecting a quadrilateral contained within the image;
  capturing visual media content contained within the quadrilateral for identifying the visual media content; and
  wherein the detecting of the quadrilateral further comprises detecting a candidate quadrilateral shape of a selected four clusters of corner points that satisfies a recognition criteria for identifying a perspective view of a rectangular display device, wherein identifying the perspective view of the rectangular display device further comprises recognizing a border of the rectangular display device, and wherein recognizing the border for the rectangular display device further comprises detecting a common border thickness for portions of the border on opposing sides.

* * * * *